United States Patent [19]

Caron

[11] Patent Number: 5,411,238
[45] Date of Patent: May 2, 1995

[54] PIVOTAL TOOL HOLDER

[76] Inventor: Clément Caron, 6, Neil Armstrong, Mansonville, Québec, Canada, J0E 1X0

[21] Appl. No.: 114,178

[22] Filed: Sep. 1, 1993

[30] Foreign Application Priority Data

Sep. 3, 1992 [GB] United Kingdom ............... 9218617

[51] Int. Cl.6 ...................... F16M 13/00; B26B 19/06
[52] U.S. Cl. ................................ 248/664; 30/296.1; 248/219.2; 248/316.1; 248/514; 248/674
[58] Field of Search ............... 30/296.1, 231, 275.4, 30/500; 16/115; 248/219.2, 229, 299, 309.1, 316.1, 514, 520, 538, 664, 674

[56] References Cited

U.S. PATENT DOCUMENTS

| | | | |
|---|---|---|---|
| 2,734,708 | 2/1956 | Cohn | 248/299 X |
| 2,887,287 | 5/1959 | Ross | 248/229 X |
| 4,063,704 | 12/1977 | Rother | 248/316.1 X |
| 4,197,764 | 4/1980 | Auernhammer | 30/275.4 X |
| 4,651,420 | 3/1987 | Lonnecker | 30/296.1 |
| 4,733,470 | 3/1988 | Firman | 30/296.1 X |
| 4,760,646 | 8/1988 | Siegler | 30/275.4 X |
| 5,029,799 | 7/1991 | Bernier | 248/514 |
| 5,070,576 | 12/1991 | Banta | 30/296.1 X |
| 5,115,598 | 5/1992 | Shaw | 248/538 X |

Primary Examiner—Rinaldi I. Rada
Assistant Examiner—Clark F. Dexter

[57] ABSTRACT

A tool holder enables a person to remotely operate a manual tool through an elongate shaft. This tool holder is formed with a first tool holder section mechanically connectable to one end of the elongate shaft, and a second tool holder section mechanically connectable to the handle of the manual tool. The first and second tool holder sections are articulated about a given pivot axis to adjust their relative angular position in which they are subsequently locked. Therefore, the tool can be remotely and manually operated through the elongate shaft after the relative angular position between the first and second tool holder sections has been adjusted to facilitate remote manual operation of the tool.

10 Claims, 2 Drawing Sheets

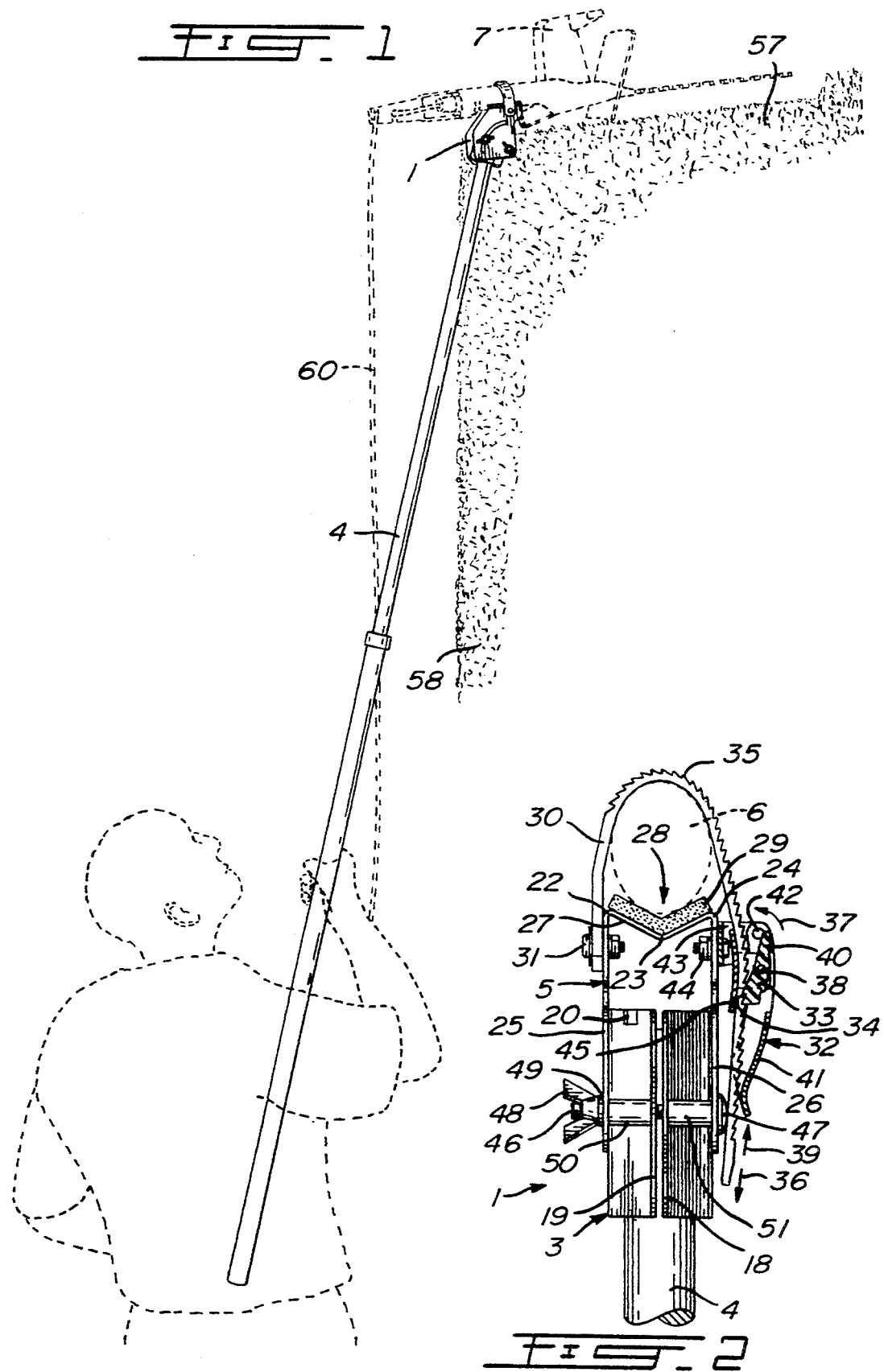

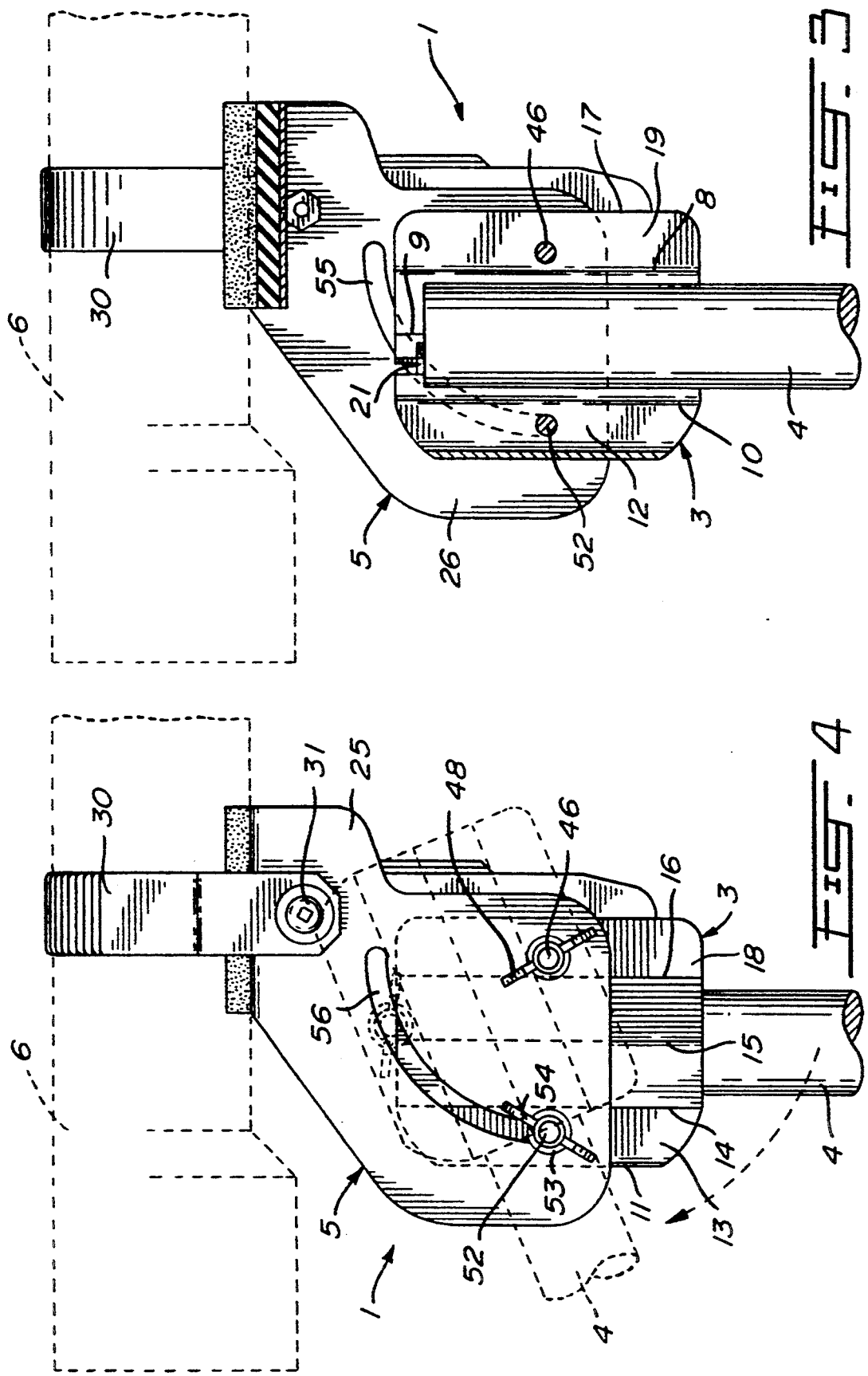

PIVOTAL TOOL HOLDER

BACKGROUND OF THE INVENTION

1. Field of the Invention

The present invention relates to a tool holder for allowing a user person to remotely operate a manual tool through an elongate shaft.

In the present specification and in the appended claims, the terms such as "manual" and "manually operated" should be interpreted as designating tools, powered or not, and used, controlled or operated by the hands of a user person.

2. Brief Description of the Prior Art

In many situations, operation of a manual tool through an elongate shaft greatly facilitates tasks carried out by means of that tool. Trimming of the top portion of a relatively high hedge is a very good example. For that purpose, one uses a hedge trimmer and a stepladder, often in a slope, to reach the top portion of the hedge. Obviously, lack of stability of the stepladder can cause serious accidents.

OBJECTS OF THE INVENTION

An object of the present invention is therefore to solve the problems of the prior art by providing a tool holder allowing a person to remotely operate a manual tool through an elongate shaft. This tool holder will enable, in particular but not exclusively, a person to trim the top portion of a relatively high hedge while standing on the ground.

SUMMARY OF THE INVENTION

More specifically, in accordance with the present invention, there is provided a tool holder for allowing a user person to remotely operate, through an elongate shaft, a manual tool provided with a handle. This holder comprises first and second tool holder sections mechanically connectable to one end of the elongate shaft and to the handle of the manual tool, respectively. A pivotal connection comprises means for articulating the first and second holder sections in order to adjust a relative angular position between these two sections, and means for locking the first and second holder sections in the adjusted relative angular position.

An advantage of the tool holder according to the invention is that the tool can be remotely and manually operated through the elongate shaft after the relative angular position between the first and second tool holder sections has been adjusted to facilitate remote manual operation of the tool.

In accordance with a first preferred embodiment of the subject invention, the first tool holder section comprises a tubular member split and bent lengthwise to form a pair of longitudinal flanges that are forced toward each other to tighten this tubular member around the corresponding end of the elongate shaft.

In accordance with another preferred embodiment of the invention, the second tool holder section is formed with two generally parallel spaced apart plate members, and the first tool holder section is positioned in between these two plate members. The articulating means of the pivotal connection comprises means for pivotally connecting the first tool holder section to the plate members of the second tool holder section about a given pivot axis generally perpendicular to these two plate members. Regarding the locking means of the pivotal connection, it comprises two semicircular slots made in the two plate members, respectively, and centered on the pivot axis, a bolt-receiving hole means in the first tool holder section, and a bolt and nut assembly comprising a bolt passing through these two semicircular slots and this hole means whereby the bolt and nut assembly (a) is loosened to enable sliding of the bolt in the semicircular slots and therefore articulation of the first and second tool holder sections about the pivot axis to adjust the relative angular position of the holder sections, and (b) is tightened to lock these first and second tool holder sections in the adjusted relative angular position. The second tool holder section further comprises a third plate member interconnecting the parallel spaced apart plate members and bent to define a channel structured to receive the handle of the manual tool, and strap means for embracing the handle of the tool in order to retain this handle in the channel. Finally, the flanges of the first tool holder section comprise respective first and second holes and the two parallel and spaced apart plate members comprise respective third and fourth holes, and the means for pivotally connecting the tool holder sections about a given axis comprises a pivot passing through the first, second, third and fourth holes.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 1 is a view showing the use of a tool holder in accordance with the present invention to remotely operate, through an elongate shaft, a manual hedge trimmer upon trimming the top portion of a relatively high hedge;

FIGS. 2 and 3 are respectively front and side elevational views, partially cross sectional, of the tool holder of FIG. 1; and FIG. 4 is a side elevational view of the tool holder of FIGS. 1, 2 and 3, showing articulation thereof.

DETAILED DESCRIPTION OF THE PREFERRED EMBODIMENT

The preferred embodiment of the tool holder in accordance with the present invention is generally identified by the reference 1 in the appended drawings.

Referring to FIGS. 2–4, the tool holder 1 comprises a first tool holder section 3 mechanically connectable to one end of an elongate shaft 4. It also comprises a second tool holder section 5 mechanically connectable to the handle 6 of a hedge trimmer 7 (FIG. 1).

Section 3 is formed of relatively thick and rigid sheet metal material. The sheet metal is first die cut to provide a blank with an appropriate contour. This blank is then bent lengthwise to form a tubular member split lengthwise and having a generally rectangular cross section.

More specifically, starting from the edge 17 (FIG. 3), the blank is first bent outwardly at 135° along longitudinal line 8. It is also bent inwardly at 90° along line 9 and then outwardly at 135° along line 10. The blank is then folded along line 11 to form a pair of generally parallel spaced apart flat walls 12 and 13. That blank is then further bent outwardly at 135° along line 14, inwardly at 90° along line 15 and outwardly at 135° along line 16.

Tool holder section 3 is therefore a tubular member generally square in cross section and defining a pair of longitudinal flanges 18 and 19, this tubular member 3 being split lengthwise between the flanges 18 and 19. Tubular member 3 is dimensioned to receive one end of the elongate shaft 4, and the flanges 18 and 19 are then forced toward each other to tighten member 3 around this elongate shaft as will be described hereinafter. The end of the elongate shaft 4 is thereby grasped by the tubular member 3.

Square end portions of the tubular member 3 are cut and bent inwardly at 90° to form respective stoppers 20 and 21. Upon insertion of the cylindrical end of the elongate shaft 4 within the tubular member 3, the end of the elongate shaft abuts against the stoppers 20 and 21 to prevent any interference of the elongate shaft with articulation of the tool holder 1.

Finally, walls 12 and 13 are provided with respective generally coaxial holes. Flanges 18 and 19 are also formed with respective generally coaxial holes. These different holes are advantageously made upon die cutting the sheet metal.

The second tool holder section 5 is also formed of relatively thick and rigid sheet metal material. The sheet metal is first die cut to provide a blank with an appropriate contour. This blank is then bent to form section 5.

More specifically, the latter blank is bent along three parallel lines (see 22, 23 and 24 in FIG. 2) to define two parallel spaced apart plate members 25 and 26, and a third plate member 27 interconnecting these parallel plate members 25 and 26. Plate member 27 is bent to define an elongate channel 28 V-shaped in cross section to receive the elongate handle 6 of the hedge trimmer 7. As illustrated, the V-shaped channel 28 opens outwardly and is covered with a layer of resilient material 29 to cause no damage to the plastic handle 6.

To retain the handle 6 in the V-shaped channel 28, a strap 30 embraces that handle. The strap 30 is made of plastic material and has a first end attached to the plate member 25 laterally of the channel 28 through a bolt and nut assembly 31. The other end of the strap 30 is attached laterally of the V-shaped channel 28 to the other plate member 26 through a buckle 32.

Buckle 32 comprises an arcuate lever 41 having a U-shaped cross section and pivotally mounted about axis 42 on a U-shaped bracket 43 itself secured to the plate member 26 through a bolt and nut assembly 44. Buckle 32 further comprises a plastic lock 33 pivotally mounted on the lever 41 about a pivot 38. The lock 33 is spring biased in the direction opposite to direction 37 of FIG. 2 to apply a saw-toothed surface 34 thereof to a saw-toothed outer surface 35 of the strap 30. The inner surface of the strap 30 slides on an arcuate, flat and smooth guide 45 pivotally mounted on the pivot 38. The spring-biased lock 33 will rotate in direction 37 to enable sliding of the strap 30 in the buckle 32 in direction 36. However, the spring biased lock 33 will prevent longitudinal sliding of the strap 30 in direction 39 to maintain the handle tightly in the V-shaped channel. To enable movement of the strap 30 in direction 39 within the buckle, the upper portion 40 of the rotatable lock 33 must be pushed manually to rotate lock 33 in direction 37. Obviously, the arcuate lever 41 provides for adequate clearance for the passage of the strap 30 and operation of the lock 33. As can be appreciated, the lever 41 can be rotated about axis 42 to help in tensioning the strap 30 embracing the handle 6 of the hedge trimmer 7.

This type of buckle 32 is well known to those of ordinary skill in the art and accordingly will not be further described in the following description.

The first and second tool holder sections 3 and 5 are articulated through a pivotal connection. For that purpose, the first tool holder section 3 is placed between the plate members 25 and 26. The pivotal connection includes a shoulder bolt 46 having a round head 47. The shoulder of bolt 46 is square and inserted in a square hole made in the plate member 26 to thereby prevent axial rotation of that bolt upon screwing of a wing nut 48. The bolt 46 further passes through the holes in the flanges 18 and 19 and through a further hole in the plate member 25. Finally, a washer 49 is inserted on the bolt 46 and applied against the outer surface of the plate member 25 and the wing nut 48 is screwed on that threaded bolt. A first tube portion 51 is inserted on the bolt 46 between the plate member 26 and the flange 18 and a second tube portion 50 is introduced on the bolt 46 between the flange 19 and plate member 25 whereby tightening of the wing nut 48 will force the flanges 18 and 19 toward each other to tighten the tubular member 3 on the end of the elongate shaft 4 while enabling articulation of the two tool holder sections 3 and 5. Pivoting of the tool holder sections 3 and 5 with respect to each other about a given pivot axis generally perpendicular to the plate members 25 and 26 and to the elongate V-shaped channel 28 is therefore enabled by means of the bolt 46.

A mechanism is further provided to lock the first and second tool holder sections 3 and 5 in a given adjusted relative angular position obtained by articulation of the sections 3 and 5 about bolt 46.

This mechanism comprises a shoulder bolt 52 having a round head (not shown) and a square shoulder (not shown), a washer 53, a wing nut 54, a semicircular slot 55 made in the plate member 26 and centered on the pivot axis of the tool holder sections 3 and 5 and therefore on the bolt 46, the holes in the respective walls 12 and 13 of tool holder section 3, and another semicircular slot 56 made in the plate member 25 and centered on the pivot axis of the tool holder sections 3 and 5 and therefore on the bolt 46. As can be seen in FIGS. 3 and 4, the semicircular slots 55 and 56 both have a same angular position about the bolt 46.

The square shoulder of bolt 52 is inserted in the semicircular slot 55 to prevent axial rotation of that bolt upon screwing of the wing nut 54. The bolt 52 further extends through the holes in the walls 12 and 13 and through the semicircular slot 56. Finally, the washer 53 is inserted on the bolt 52 and applied against the outer surface of the plate member 25 and the wing nut 54 is screwed on that threaded bolt.

In order to remotely and manually operate the hedge trimmer 7 (see FIG. 1) through the elongate shaft 4 after the relative angular position between the first and second sections 3 and 5 of the tool holder 1 has been adjusted to facilitate trimming of the top portion 57 of a relatively high hedge 58, the following operation are carried out:

the wing nuts 48 and 54 are loosened;
    the end of the elongate shaft 4 is inserted in the tubular member 3 until it abuts against the stoppers 20 and 21;
    the wing nut 48 is tightened to thereby tighten the tubular member 3 around the end of the elongate shaft 4;

the strap 30 is loosened, the handle 6 of the hedge trimmer 7 is placed in the channel 28, and the strap 30 is tightened by means of the buckle 32 to embrace the handle 6 and retain this handle in the channel 28;

the wing nut 54 being loosened, the bolt 52 is free to slide in the semicircular slots 55 and 56 whereby the tool holder sections 3 and 5 can be articulated about bolt 46 until the desired relative angular position of these two sections 3 and 5 is reached (wing nut 48 can be slightly loosened to facilitate this adjustment operation); and the nut 54 is then tightened to lock the first and second tool holder sections 3 and 5 in their adjusted relative angular position.

The hedge trimmer can then be remotely and manually operated through the elongate shaft 4 with the relative angular position between the first and second tool holder sections 3 and 5 adjusted to facilitate trimming of the upper portion 57 of the hedge 58.

In the example illustrated in FIG. 1, the elongate shaft 4 is telescopic. A further adjustment is therefore to adjust the length of the shaft 4.

Although the present invention has been described in the foregoing description in relation to a manual hedge trimmer 7 supplied with electric current though a cord 60, one of ordinary skill in the art will appreciate that the tool holder 1 of the invention can be easily used as such with many other types of manual tools, electric or not. It is also within the scope of the present invention to modify the illustrated version of the tool holder for adaptation to other types of manual tools.

Although the present invention has been described hereinabove by way of a preferred embodiment thereof, this embodiment can be modified at will, within the scope of the appended claims, without departing from the spirit and nature of the subject invention.

What is claimed is:

1. A tool holder for allowing a user to remotely operate, through an elongate shaft, a manual tool provided with a handle, comprising:
    a first tool holder section with means for mechanically connecting said first tool holder section; to one end of said elongate shaft;
    a second tool holder section with means for mechanically connecting said second tool holder section; to said handle of the manual tool, wherein (a) said second tool holder section comprises first and second generally parallel, spaced apart plate members and a third plate member interconnecting said first and second plate members, (b) said first tool holder section is positioned in between said first and second plate members, and (c) said third plate member is bent to define a channel on a side of said third plate member opposite to the first tool holder section, said channel being structured to receive the handle of said manual tool; and
    a pivotal connection comprising means for pivotally mounting said first tool holder section between said first and second plate members to thereby enable articulation of the first and second holder sections in order to adjust a relative angular position between said holder sections, and means for locking said first and second holder sections in the adjusted relative angular position;
    whereby the tool is remotely and manually operated with said elongate shaft after the relative angular position between said first and second tool holder sections has been adjusted to facilitate remote manual operation of said tool.

2. The tool holder as recited in claim 1, wherein said first tool holder section comprises means for holding said one end of the elongate shaft.

3. The tool holder as recited in claim 2, in which said holding means comprises a tubular member split and bent lengthwise to form a pair of longitudinal flanges that are forced toward each other to tighten said tubular member around said one end of the elongate shaft.

4. The tool holder as recited in claim 1, wherein said pivotally mounting means of the pivotal connection comprises:
    pivot means for articulating said first tool holder section between the first, and second plate members of the second tool holder section about a given pivot axis generally perpendicular to said first and second plate members; and wherein said locking means of the pivotal connection comprises:
    two semicircular slots made in said first and second plate members, respectively, said semicircular slots being centered on said pivot axis;
    a bolt-receiving hole means in said first tool holder section; and
    a bolt and nut assembly comprising a bolt passing through said two semicircular slots and said hole means whereby said bolt and nut assembly (a) is loosened to enable sliding of said bolt in said semicircular slots and therefore articulation of said first and second tool holder sections about said pivot axis to adjust the relative angular position of said holder sections, and (b) is tightened to look said first and second tool holder sections in the adjusted relative angular position.

5. The tool holder as recited in claim 4, in which said second tool holder section further comprises
    strap means for embracing the handle of the tool in order to retain said handle in said channel of the third plate member.

6. The tool holder as recited in claim 5, in which said handle and channel are elongate, said channel is perpendicular to said pivot axis, and said strap means extends perpendicular to said handle and said channel.

7. The tool holder as recited in claim 6, wherein said elongate channel has a V-shaped cross section.

8. The tool holder as recited in claim 4, in which said first tool holder section comprises a tubular member split and bent lengthwise to form a pair of longitudinal flanges that are forced toward each other to tighten said tubular member around said one end of the elongate shaft.

9. The tool holder as recited in claim 8, wherein said flanges comprise respective first and second holes and said first and second parallel and spaced apart plate members comprise respective third and fourth holes, and wherein said pivot means comprises an elongated member passing through the first, second, third and fourth holes.

10. The tool holder as recited in claim 1, in which said second tool holder section comprises means for removably securing said handle of the manual tool in said channel of the third plate means of said second tool holder section.

* * * * *